US012784143B2

(12) United States Patent
Xie et al.

(10) Patent No.: US 12,784,143 B2
(45) **Date of Patent: *Nov. 3, 2026**

(54) GENERATION NETWORK FOR STYLE CONVERSION

(71) Applicant: TENCENT TECHNOLOGY (SHENZHEN) COMPANY LIMITED, Shenzhen (CN)

(72) Inventors: Xinpeng Xie, Shenzhen (CN); Jiawei Chen, Shenzhen (CN); Yuexiang Li, Shenzhen (CN); Kai Ma, Shenzhen (CN); Yefeng Zheng, Shenzhen (CN)

(73) Assignee: TENCENT TECHNOLOGY (SHENZHEN) COMPANY, Shenzhen (CN)

( * ) Notice: Subject to any disclaimer, the term of this patent is extended or adjusted under 35 U.S.C. 154(b) by 251 days.

This patent is subject to a terminal disclaimer.

(21) Appl. No.: 18/891,939

(22) Filed: Sep. 20, 2024

(65) Prior Publication Data

US 2025/0014150 A1 Jan. 9, 2025

Related U.S. Application Data

(63) Continuation of application No. 17/706,823, filed on Mar. 29, 2022, now Pat. No. 12,125,170, which is a (Continued)

(30) Foreign Application Priority Data

Jan. 19, 2020 (CN) ........................ 202010061014.X

(51) Int. Cl.
*G06T 5/50* (2006.01)
*G06T 7/00* (2017.01)

(52) U.S. Cl.
CPC .................. *G06T 5/50* (2013.01); *G06T 7/97* (2017.01); *G06T 2207/20081* (2013.01); *G06T 2207/20084* (2013.01)

(58) Field of Classification Search
USPC ....... 382/100, 155, 219, 224, 254, 276, 305, 382/312
See application file for complete search history.

(56) References Cited

U.S. PATENT DOCUMENTS 9,576,351 B1 * 2/2017 Barzel ..................... G06T 11/60
9,922,432 B1 * 3/2018 Risser ..................... G06T 11/00

(Continued)

FOREIGN PATENT DOCUMENTS

CN 110322002 A 10/2019
CN 110427799 A 11/2019

(Continued)

OTHER PUBLICATIONS

G. Brostow, J. Shotton, J. Fauqueur, and R. Cipolla. Segmentation and recognition using structure from motion point clouds. In ECCV, 2008.

(Continued)

*Primary Examiner* — Seyed H Azarian
(74) *Attorney, Agent, or Firm* — ArentFox Schiff LLP

(57) ABSTRACT

In an image processing method, style conversion is performed on a sample image by using a generation network, to obtain a reference image. Style recognition is performed on the reference image by using an adversarial network, to determine a style loss between the reference image and the sample image. Image content recognition is performed on the reference image and the sample image, to determine a content loss between the reference image and the sample (Continued)

image. The generation network is trained based on the style loss and the content loss, to obtain a trained generation network.

19 Claims, 9 Drawing Sheets

Related U.S. Application Data continuation of application No. PCT/CN2020/123838, filed on Oct. 27, 2020.

(56) References Cited

U.S. PATENT DOCUMENTS

| | | | | |
|---|---|---|---|---|
| 10,115,004 B2 * | 10/2018 | Juefei-Xu | ............... | G06F 18/28 |
| 10,424,087 B2 * | 9/2019 | Risser | ..................... | G06T 11/00 |
| 11,250,548 B2 * | 2/2022 | Lin | ......................... | G06N 3/045 |
| 2018/0204121 A1 * | 7/2018 | Wang | ...................... | G06F 16/50 |
| 2020/0349391 A1 * | 11/2020 | Zhang | ...................... | G06N 3/08 |

FOREIGN PATENT DOCUMENTS

| | | |
|---|---|---|
| CN | 111242844 A | 6/2020 |
| CN | 107886533 B | 5/2021 |

OTHER PUBLICATIONS

H. Fu, M. Gong, C. Wang, B. Kayhan, K. Zhang, and D. Tao. Geometry-consistent generative adversarial networks for one-sided unsupervised domain mapping. In CVPR,2019.

International Search Report and Written Opinion received for PCT Patent Application No. PCT/CN2020/123838, mailed on Jan. 27, 2021, 17 pages (7 pages of English Translation and 10 pages of Original Document).

Office Action received for Japanese Patent Application No. 2022-523029, mailed on Jun. 5, 2023, 6 pages (3 pages of English Translation and 3 pages of Original Document).

Pengfei Li et al., "Semantic GAN: Application for cross-domain image Style transfer", 2019 IEEE International Conference on Multimedia and Expo (ICME), Jul. 8, 2019, p. 910-915.

S. Huang, C. Lin, S. Chen, Y. Wu, P. Hsu, and S. Lai. AugGAN: Cross domain adaptation with GAN-based data augmentation. In ECCV, 2018.

Wei Wang et al., "Image Artistic Style Migration based on Convolutional Neural Network", 2018 5th International Conference on Systems and informatics (ICSAI), Nov. 10, 2018, pp. 967-972.

Z. Zhang, L. Yang, and Y. Zheng. Translating and segmenting multimodal medical volumes with cycle- and shape-consistency generative adversarial network. In CVPR, 2018.

* cited by examiner

GENERATION NETWORK FOR STYLE CONVERSION

RELATED APPLICATIONS

This present application is a continuation of U.S. application Ser. No. 17/706,823, "IMAGE PROCESSING METHOD AND APPARATUS, SERVER, AND STORAGE MEDIUM" filed on Mar. 29, 2022, which is a continuation of International Application No. PCT/CN2020/123838, "IMAGE PROCESSING METHOD AND APPARATUS, SERVER AND STORAGE MEDIUM" filed on Oct. 27, 2020, which claims priority to Chinese Patent Application No. 202010061014.X, entitled "IMAGE PROCESSING METHOD AND APPARATUS, SERVER, AND STORAGE MEDIUM," and filed on Jan. 19, 2020, which are hereby incorporated by reference in their entirety.

FIELD OF THE TECHNOLOGY

This application relates to the field of computers, including an image processing method and apparatus, a server, and a storage medium.

BACKGROUND OF THE DISCLOSURE

Artificial intelligence (AI) is a technology that uses a digital computer to simulate a human to perceive an environment, obtain knowledge, and use the knowledge. This technology may enable machines to have functions similar to human perception, reasoning, and decision-making. The AI technology mainly includes several major directions such as a computer vision (CV) technology, a speech processing technology, a natural language processing technology, and machine learning (ML)/deep learning (DL).

CV is a technology that uses a computer to replace human eyes to perform operations such as recognition and measurement on a target image and perform further processing. The CV technologies generally include technologies such as image processing, image recognition, image semantic understanding, image retrieval, virtual reality, augmented reality, synchronous positioning, and map construction, for example, image processing technologies such as image colorization and image stroke and extraction.

Currently, an image generated by using an image style type conversion method performed by using the CV technologies often has a plurality of image distortion problems, such as local deformation of the image, lack of color information of the image, and an image style type error. Therefore, an image generated by using a current image processing method has low quality.

SUMMARY

In an embodiment, an image processing method includes obtaining a sample image and a generative adversarial network (GAN), the GAN including a generation network and an adversarial network, and performing style conversion on the sample image by using the generation network, to obtain a reference image. The method further includes performing global style recognition on the reference image by using the adversarial network, to determine a global style loss between the reference image and the sample image, and performing image content recognition on the reference image and the sample image, to determine a content loss between the reference image and the sample image. The method also includes performing local style recognition on the reference image and the sample image, to determine a local style loss of the reference image and a local style loss of the sample image, training the generation network based on the global style loss, the content loss, the local style loss of the reference image, and the local style loss of the sample image, to obtain a trained generation network, and performing, by a server, style conversion on a to-be-processed image by using the trained generation network, to obtain a style converted image.

In an embodiment, an image processing apparatus includes processing circuitry configured to obtain a sample image and a generative adversarial network (GAN), the GAN including a generation network and an adversarial network, and perform style conversion on the sample image by using the generation network, to obtain a reference image. The processing circuitry is further configured to perform global style recognition on the reference image by using the adversarial network, to determine a global style loss between the reference image and the sample image, and perform image content recognition on the reference image and the sample image, to determine a content loss between the reference image and the sample image. The processing circuitry is also configured to perform local style recognition on the reference image and the sample image, to determine a local style loss of the reference image and a local style loss of the sample image, train the generation network based on the global style loss, the content loss, the local style loss of the reference image, and the local style loss of the sample image, to obtain a trained generation network, and perform style conversion on a to-be-processed image by using the trained generation network, to obtain a style converted image.

In an embodiment, a non-transitory computer-readable storage medium stores computer-readable instructions thereon, which, when executed by a processor, cause the processor to perform an image processing method. The method includes obtaining a sample image and a generative adversarial network (GAN), the GAN including a generation network and an adversarial network, and performing style conversion on the sample image by using the generation network, to obtain a reference image. The method further includes performing global style recognition on the reference image by using the adversarial network, to determine a global style loss between the reference image and the sample image, and performing image content recognition on the reference image and the sample image, to determine a content loss between the reference image and the sample image. The method also includes performing local style recognition on the reference image and the sample image, to determine a local style loss of the reference image and a local style loss of the sample image, training the generation network based on the global style loss, the content loss, the local style loss of the reference image, and the local style loss of the sample image, to obtain a trained generation network, and performing style conversion on a to-be-processed image by using the trained generation network, to obtain a style converted image.

Details of one or more embodiments of this application are provided in the following drawings and descriptions. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings describing the embodiments. The accompanying drawings in the following description show only some embodiments of this application, and a person skilled in the art may still derive other accompanying drawings from these accompanying drawings.

DESCRIPTION OF EMBODIMENTS

To make the objectives, technical solutions, and advantages of this application clearer and more understandable, this application is further described in detail below with reference to the accompanying drawings and embodiments. It is to be understood that the specific embodiments described herein are only used for explaining this application, and are not used for limiting this application.

The technical solutions in the embodiments of this application are described below with reference to the accompanying drawings in the embodiments of this application. The described embodiments are merely some rather than all of the embodiments of this application. All other embodiments obtained by a person skilled in the art based on the embodiments of this application shall fall within the protection scope of this application.

The embodiments of this application provide an image processing method and apparatus, a server, and a storage medium.

The image processing apparatus may be specifically integrated in an electronic device. The electronic device may be a device such as a terminal or a server. The terminal may be a device such as a mobile phone, a tablet computer, a smart Bluetooth device, a notebook computer, or a personal computer (PC). The server may be an independent physical server, may be a server cluster including a plurality of physical servers or a distributed system, or may be a cloud server for providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

In some embodiments, the image processing apparatus may alternatively be integrated in a plurality of electronic devices. For example, the image processing apparatus may be integrated in a plurality of servers, and the plurality of servers implement the image processing method in this application.

In some embodiments, the server may alternatively be implemented in the form of the terminal.

Figure 1A:
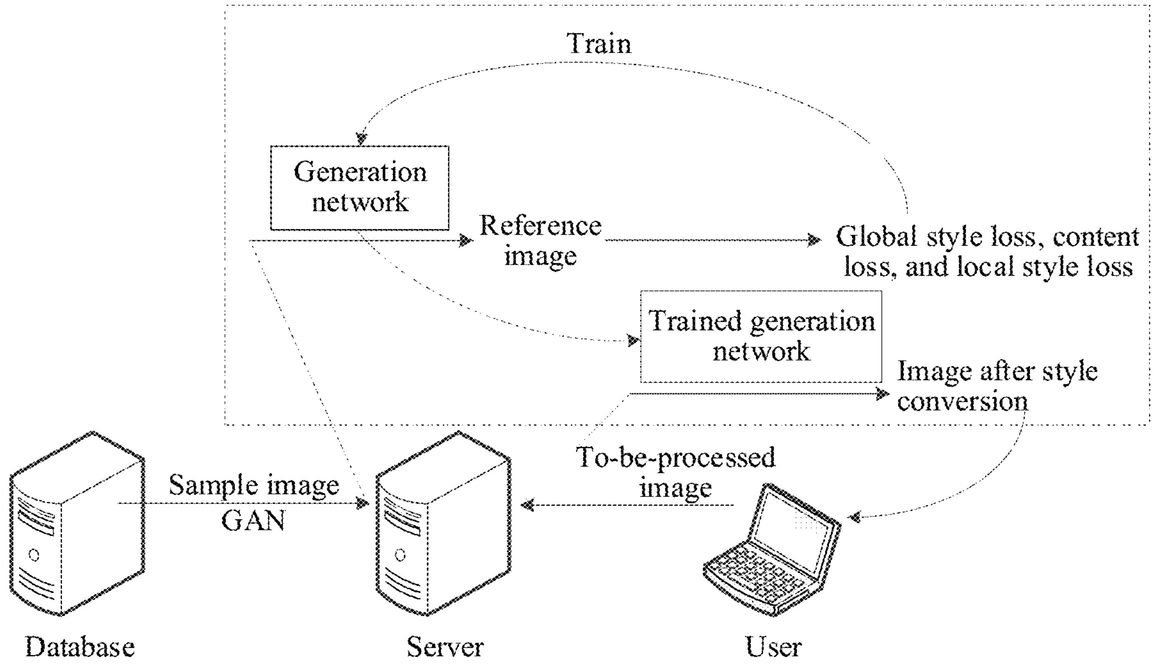
FIG. 1*a* is a schematic scenario diagram of an image processing method according to an embodiment of this application.

For example, referring to FIG. 1*a*, the server may be equipped with an image processing apparatus. The server may obtain a sample image and a GAN from a database, the GAN including a generation network and an adversarial network; perform style conversion on the sample image by using the generation network, to obtain a reference image; perform global style recognition on the reference image by using the adversarial network, to determine a global style loss between the reference image and the sample image; perform image content recognition on the reference image and the sample image, to determine a content loss between the reference image and the sample image; perform local style recognition on the reference image and the sample image, to determine a local style loss of the reference image and a local style loss of the sample image; and train the generation network based on the global style loss, the content loss, the local style loss of the reference image, and the local style loss of the sample image, to obtain a trained generation network. When obtaining a to-be-processed image uploaded by a user, the server may perform style conversion on the to-be-processed image by using the trained generation network, to obtain an image after the style conversion, and return the image after the style conversion to the user.

Detailed descriptions are separately provided below. Sequence numbers of the following embodiments are not intended to limit preference orders of the embodiments.

ML is a method in which a series of analyses are performed based on preliminary understanding of data and a purpose of learning, parameters in a mathematical model are trained, and the data is finally analyzed and predicted by using a trained model. Methods of the ML generally include deep learning, a decision tree algorithm, a Bayesian algorithm, a support vector machine algorithm, a random forest algorithm, an artificial neural network algorithm, an association rule algorithm, an expectation maximization algorithm, and the like.

Figure 1B:
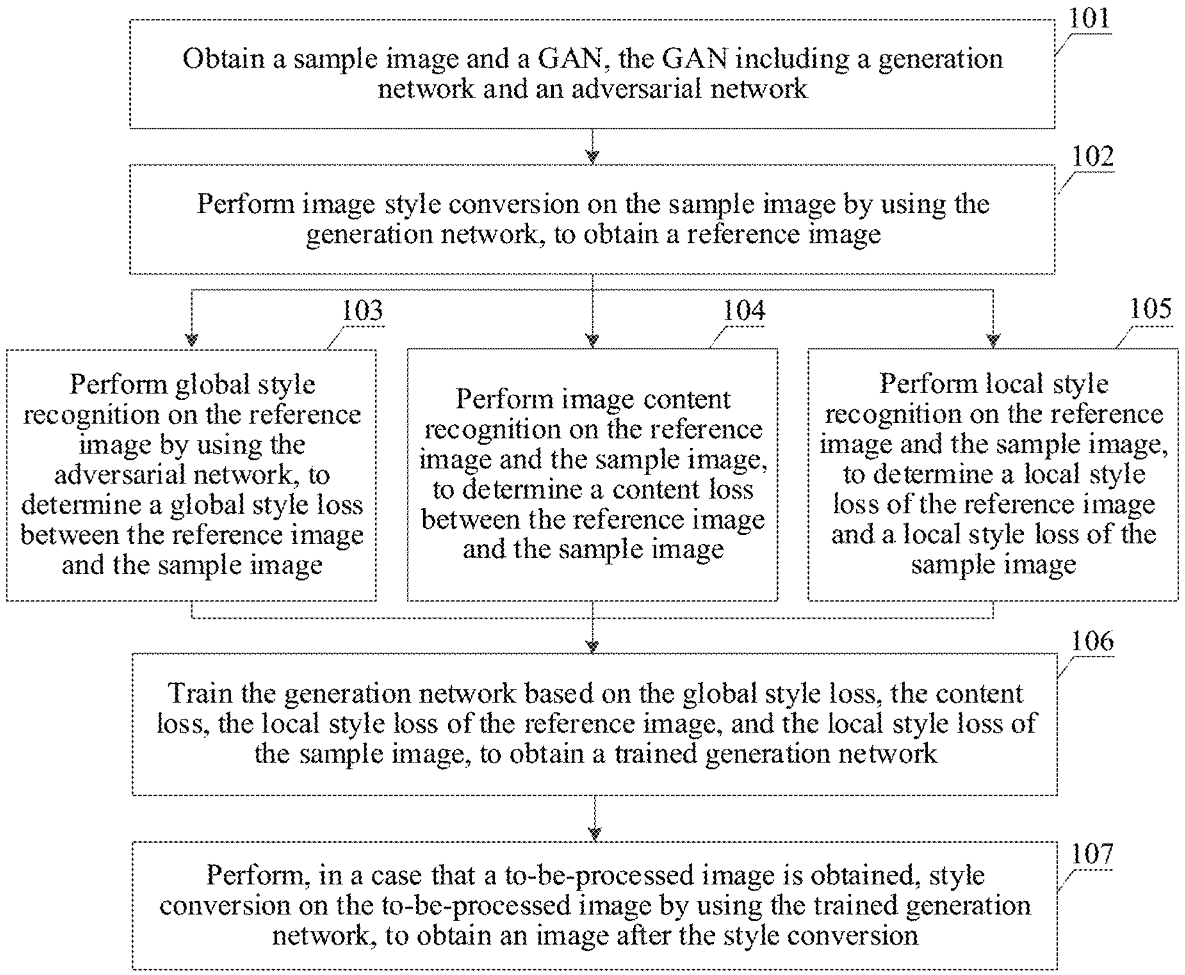
FIG. 1*b* is a first schematic flowchart of an image processing method according to an embodiment of this application.

In this embodiment, an ML-based image processing method is provided. As shown in FIG. 1*b*, a specific procedure of the image processing method may be as follows.

In step 101, a sample image and a GAN are obtained, the GAN including a generation network and an adversarial network, According to the embodiments in this solution, image processing may be used. Image data annotated with an image style type may be used as a sample image for training a generation network and an adversarial network in the GAN.

The generation network may be configured to convert an image style type of an image, where the image style type may be an artistic style type of the image, such as an artistic genre style type, an artistic era style type, or a custom style type. For example, the artistic genre style type may include impressionism, abstraction, realism, and the like. The artistic era style type may include traditional classicism, modern realism, and the like.

The GAN may be any type of GAN, including at least one generation network and discriminative network. During training, the generation network and the discriminative network may learn from each other in a game, to optimize network parameters, so that a network output performs well.

For example, in some embodiments, the GAN may be any type of GAN, such as a conditional generative adversarial network (CGAN), a deep convolutional generative adversarial network (DCGAN), a Wasserstein generative adversarial network (WGAN), or a cycleGAN.

The generation network may be an artificial neural network model configured for image style type conversion, and the adversarial network may be an artificial neural network model configured for image global style recognition.

In some embodiments, the GAN may alternatively be any type of visual geometry group (VGG) network, such as VGG16 or VGG19.

There are a plurality of specific ways of obtaining a sample image and a GAN, and the ways of obtaining a sample image and a GAN may be the same or different. Specific obtaining methods may be obtaining from a sample database through a network, reading in a local memory, obtaining through an input of a local technician, and so on.

In step 102, style conversion is performed on the sample image by using the generation network, to obtain a reference image.

The GAN may perform style conversion on the sample image, where the style conversion refers to converting a partial or whole style type of the image into another style type, and the integrity of content expressed by the image is ensured.

For example, a painting of a specific style type is wholly converted into a modern style type, a realistic style type, or a traditional style type; in another example, a picture of a specific style type is wholly converted into a sunny day style type, a rainy style type, or a misty style type; and in another example, a picture of a specific style type is partially converted into a user-defined style type, or the like.

Figure 1C:
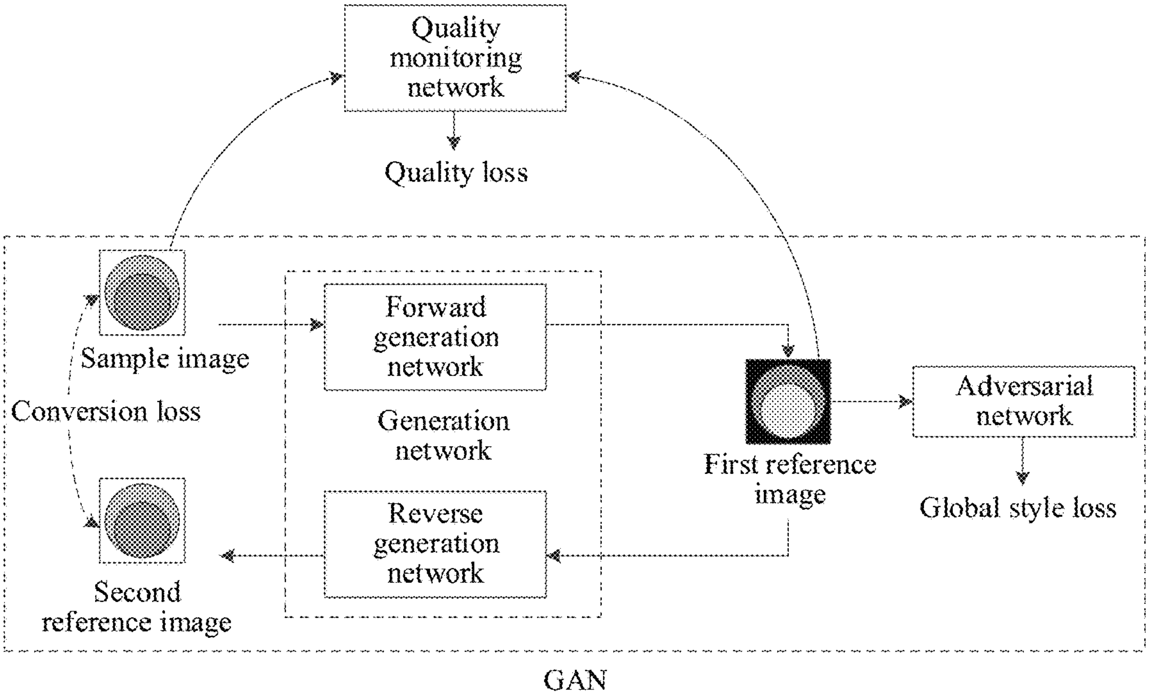
FIG. 1*c* is a schematic diagram of a network structure of an image processing method according to an embodiment of this application.

In some embodiments, referring to FIG. 1*c*, the GAN may include a generation network and an adversarial network, the reference image may include a first reference image and a second reference image, and step 102 may include: performing, by using the generation network, style conversion on the sample image to obtain the first reference image, and performing style conversion on the first reference image to obtain the second reference image.

In some embodiments, to ensure the efficiency of image processing and the quality of the final generated image, the generation network includes a forward generation network and a reverse generation network, the sample image includes a forward sample image, the first reference image includes a first forward reference image, and the second reference image includes a second forward reference image. Referring to FIG. 1*c*, the step of "performing, by using the generation network, style conversion on the sample image to obtain the first reference image, and performing style conversion on the first reference image to obtain the second reference image" may specifically include performing style conversion on the forward sample image by using the forward generation network, to obtain the first forward reference image, and performing style conversion on the first forward reference image by using the reverse generation network, to obtain the second forward reference image.

Network structures of the forward generation network and the reverse generation network are similar. In the forward generation network, the image style type of the sample image may be converted into another image style type, while the reverse generation network may perform restoration of a style type on the image after the style conversion outputted by the forward generation network, so that the image after the style conversion is as close as possible to an original image style type of the sample image. That is, an input image of the forward generation network is the same as or similar to an output image of the reverse generation network, and an output image of the forward generation network is the same as or similar to an input image of the reverse generation network.

The sample image may include a forward sample image and a reverse sample image, which are a pair of images with different image style types but similar presentation content. That is, the reverse sample image is an image obtained after style type conversion is performed on the forward sample image.

In this case, in some embodiments, in step 103, a similarity between the first reference image and the sample image may be predicted by using the adversarial network; and the global style loss between the reference image and the sample image is calculated according to the similarity between the first reference image and the sample image.

Therefore, the adversarial network may define a global image style type of the first reference image, thereby improving the accuracy of the style type conversion of the image.

In some embodiments, the first reference image may include a first forward reference image, and the second reference image may include a second forward reference image, the first forward reference image being an image generated after first-time image style type conversion is performed on the forward sample image in the forward generation network, the second forward reference image being an image generated after second-time image style type conversion is performed on the first forward reference image in the forward generation network.

Therefore, in some embodiments, the generation network may include a forward generation network and a reverse generation network, the sample image may include a reverse sample image, the first reference image may include a first reverse reference image, and the second reference image may include a second reverse reference image. Referring to a positive cycle part in FIG. 1*d*, the step of "performing, by using the generation network, style conversion on the sample image to obtain the first reference image, and performing style conversion on the first reference image to obtain the second reference image" specifically includes the following steps: performing style conversion on the forward sample image by using the forward generation network, to obtain the first forward reference image; and performing style conversion on the first forward reference image by using the reverse generation network, to obtain the second forward reference image.

In some embodiments, the generation network may include a forward generation network and a reverse generation network, the sample image includes a reverse sample image, the first reference image includes a first reverse reference image, and the second reference image includes a second reverse reference image. The step of "performing, by using the generation network, style conversion on the sample image to obtain the first reference image, and performing style conversion on the first reference image to obtain the second reference image" specifically includes the following steps: performing style conversion on the reverse sample image by using the reverse generation network, to obtain the first reverse reference image; and performing style conversion on the first reverse reference image by using the forward generation network, to obtain the second reverse reference image.

Figure 1D:
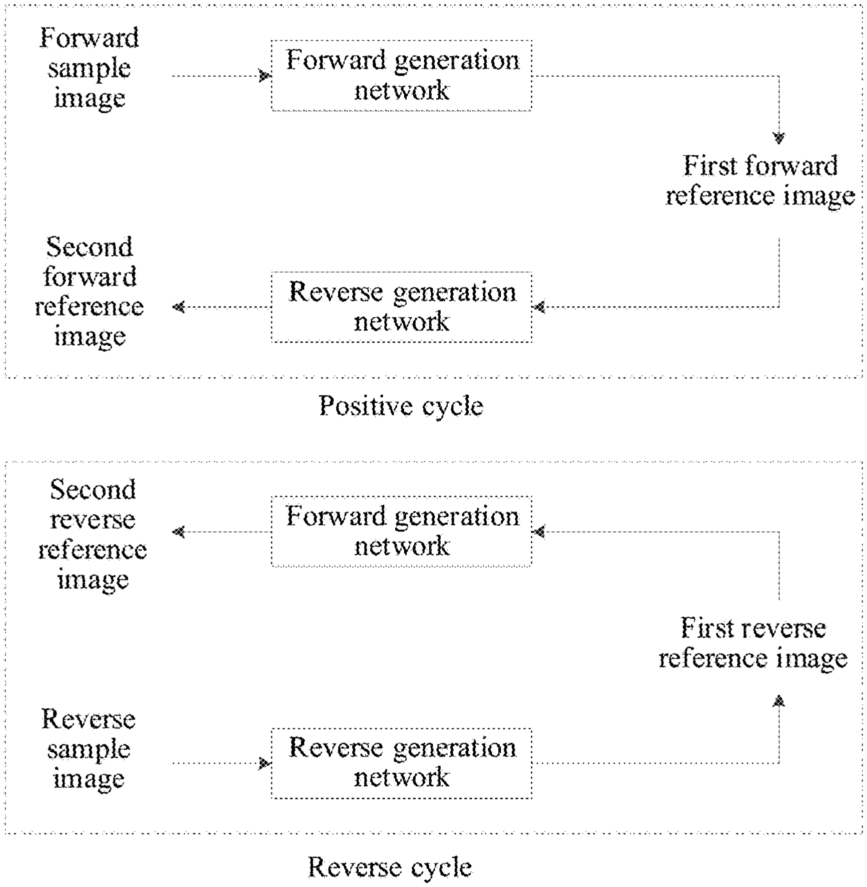
FIG. 1*d* is a schematic diagram of a cycle generative adversarial network (cycleGAN) of an image processing method according to an embodiment of this application.

For example, referring to FIG. 1*d*, FIG. 1*d* shows a cycleGAN network, where a positive cycle structure of the cycleGAN network is located in an upper part of FIG. 1*d*. In a positive cycle, a forward sample image is first inputted into a forward generation network, to generate a first forward reference image, and the first forward reference image is then inputted into a reverse network, to generate a second forward reference image; and a reverse cycle structure of the cycleGAN network is located in a lower part of FIG. 1*d*, where in a reverse cycle, a reverse sample image is first inputted into a reverse generation network, to generate a first reverse reference image, and the first reverse reference image is then inputted into a forward network, to generate a second reverse reference image.

In some embodiments, to further improve the quality and efficiency of style type conversion, referring to FIG. 1*c*, after the step of "performing, by using the generation network, style conversion on the sample image to obtain the first reference image, and performing style conversion on the first reference image to obtain the second reference image", a conversion loss between the sample image and the second reference image may be further calculated. In this case, step 106 may specifically include: training the generation network based on the conversion loss, the global style loss, the content loss, the local style loss of the reference image, and the local style loss of the sample image, to obtain the trained generation network.

The conversion loss is a loss of an image feature such as a pixel, color distribution, and image content between two images.

In step 103, global style recognition is performed on the reference image by using the adversarial network, to determine a global style loss between the reference image and the sample image.

The global style type is an image style type shown by the reference image in terms of the entire image.

In some embodiments, an image may show a plurality of image style types, and a global style type of the image may integrate the image style types. For example, in a painting, an upper left corner of the painting shows a modern art style, a lower right corner of the painting shows a traditional art style, a remaining part of the entire painting shows a realistic art style, and therefore a specific global style type of the painting is a mixed realistic art style.

Specifically, in some embodiments, step 103 specifically includes the following steps: predicting a similarity between the first reference image and the sample image by using the adversarial network; and calculating the global style loss between the reference image and the sample image according to the similarity between the first reference image and the sample image.

The adversarial network may determine an image style type of the first reference image by calculating a preset range within which the similarity between the first reference image and the sample image falls.

In some other embodiments, the adversarial network may separately calculate a similarity between the first reference image and the sample image, and a similarity between the first reference image and the reverse sample image, to determine an image style type of the first reference image according to magnitudes of the two similarities.

For example, in some embodiments, the following steps may be specifically included: predicting, by using the adversarial network, a similarity between the first reference image and the sample image, and a similarity between the first reference image and the reverse sample image; in response to a determination that the similarity between the first reference image and the sample image is higher than the similarity between the first reference image and the reverse sample image, determining an image style type of the first reference image as the forward sample image; and in response to a determination that the similarity between the first reference image and the sample image is lower than the similarity between the first reference image and the reverse sample image, determining an image style type of the first reference image as the reverse sample image.

Specifically, the step of "calculating the global style loss between the reference image and the sample image according to the similarity between the first reference image and the sample image" includes: in response to a determination that the similarity between the first reference image and the sample image falls within a preset forward range, determining an image style type of the first reference image as the image style type of the first reference image; and in response to a determination that the similarity between the first reference image and the sample image falls within a preset reserve range, determining the image style type of the first reference image as an image style type of the second reference image; collecting statistics on the image style types of the first reference image, to obtain a statistical result; and calculating the global style loss between the reference image and the sample image according to the statistical result.

In step 104, image content recognition is performed on the reference image and the sample image, to determine a content loss between the reference image and the sample image.

Image content recognition may be performed on the reference image and the sample image by using a quality monitoring network, to determine a content loss between the reference image and the sample image. The quality monitoring network may be an artificial neural network model configured to monitor and control a difference between an input and an output of the GAN.

The quality monitoring network may be a convolutional network model (CNN), a fully connected neural network (FNN), a deep neural network (DNN), or the like.

In some embodiments, the quality monitoring network may be any image comparison network, such as a back-propagation neural network (BPNN) or a siamese network (SN).

Specifically, in some embodiments, the quality monitoring network may include a content monitoring network and a style monitoring network. For example, the quality monitoring network may be an SN, the SN includes a content monitoring network and a style monitoring network. The content monitoring network may be configured to perform step 104, and the style monitoring network may be configured to perform step 105.

Figure 1E:
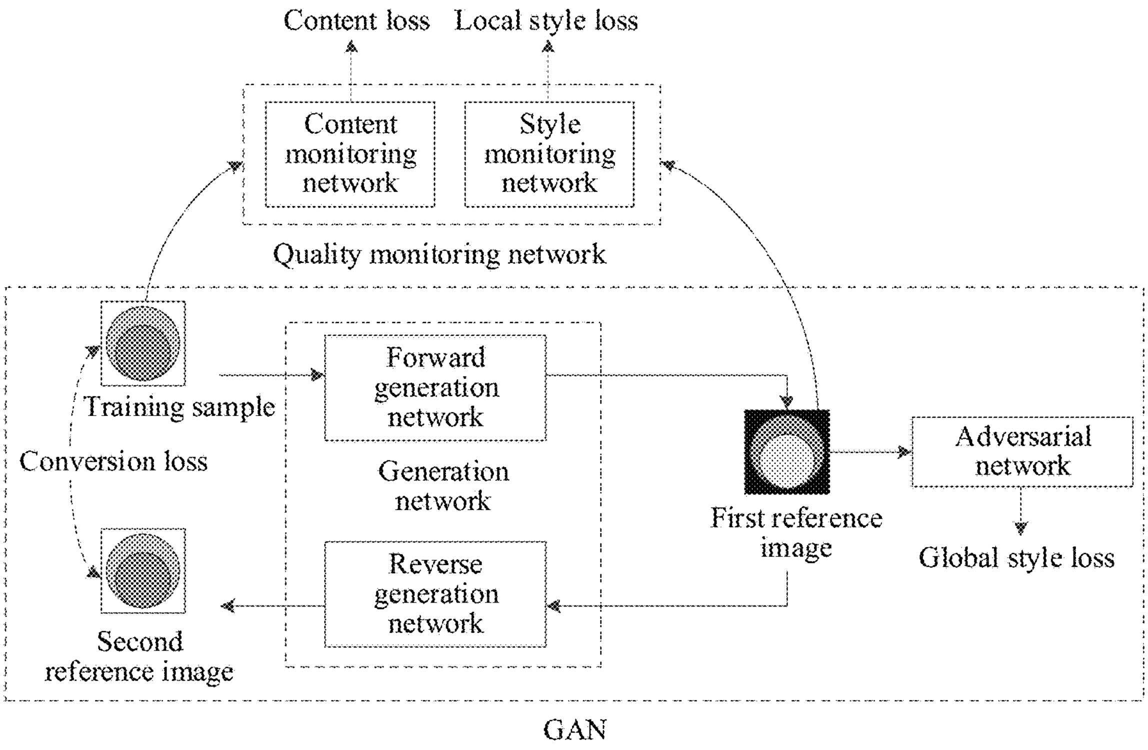
FIG. 1*e* is a schematic diagram of a generative adversarial network (GAN) of an image processing method according to an embodiment of this application.

For example, referring to FIG. 1*e*, the content monitoring network may perform content comparative analysis on the reference image and the sample image, to obtain a content loss between the reference image and the sample image; and the style monitoring network may perform style type recognition on the reference image, to obtain a local style loss of the reference image.

Referring to FIG. 1*c*, the quality monitoring network may monitor a quality loss between the reference image and the sample image. In some embodiments, the quality loss may include the content loss and the local style loss. The content monitoring network may monitor the content loss, and the style monitoring network may monitor the local style loss.

Figure 1F:
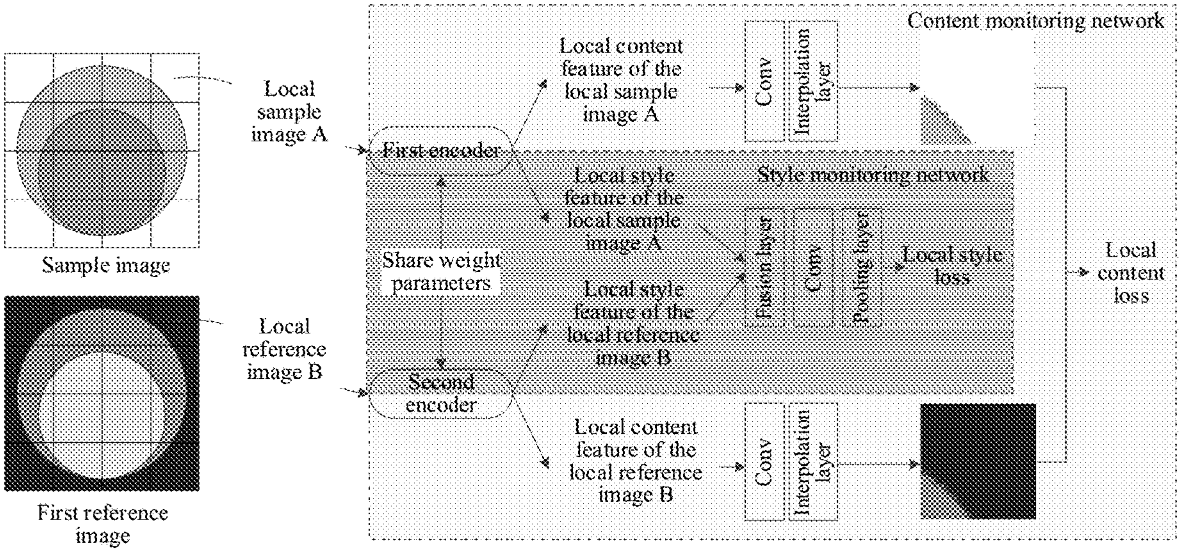
FIG. 1*f* is a schematic structural diagram of a quality monitoring network of an image processing method according to an embodiment of this application.

Specifically, in some embodiments, to ensure the style type and the content quality of the reference image, to prevent the reference image from being deformed and ensure that the performance of the global style type is more balanced and stable, a network structure shown in FIG. 1*f* is used. FIG. 1*f* shows a network structure of a quality monitoring network, where a dark color part is a style monitoring network, and a light color part is a quality monitoring network. A reference image may include a plurality of local reference images, and a sample image may include a plurality of local sample images (where in FIG. 1*f*, the reference image may include 16 local reference images, and the sample image may include 16 local sample images). A local reference image is determined from all the local images of the reference image, and a local sample image is determined from all the local images of the sample image, a position of the local reference image in the reference image being the same as a position of the local sample image in the sample image. A local reference content feature corresponding to the local reference image and a local sample content feature corresponding to the local sample image are extracted by using a content monitoring network of an SN. The local reference content feature is compared with the local sample content feature, to obtain a local content loss between the local reference image and the local sample image. A content loss between the reference image and the sample image is determined according to the local content loss.

The content monitoring network may perform content feature extraction on the local reference image and the local sample image that are at the same position. For example, referring to FIG. 1*f*, the content monitoring network may also perform content feature extraction on a local reference image and a local sample image that are in a first row and a fourth column.

In some embodiments, the SN may include a first encoder and a second encoder. In the SN, the first encoder and the second encoder share weight parameters with each other.

In some embodiments, the step of "extracting, by using the content monitoring network of the SN, a local reference content feature corresponding to the local reference image, and a local sample content feature corresponding to the local sample image" may include the following steps: performing content feature extraction on the local sample image by using the first encoder, to obtain the local sample content feature of the local sample image; and performing content feature extraction on the local reference image by using the second encoder, to obtain the local reference content feature of the local reference image.

For example, referring to FIG. 1*f*, the first encoder may perform content feature extraction on a local sample image A, to obtain a local content feature of the local sample image A; and the second encoder may perform content feature extraction on a local reference image B, to obtain a local content feature of the local reference image B.

In step 105, local style recognition is performed on the reference image and the sample image, to determine a local style loss of the reference image and a local style loss of the sample image.

In some embodiments, the step 105 may include: performing local style recognition on the reference image and the sample image by using a style monitoring network of the SN, to determine the local style loss of the reference image and the local style loss of the sample image.

Specifically, the step of "performing local style recognition on the reference image and the sample image by using a style monitoring network of the SN, to determine the local style loss of the reference image and the local style loss of the sample image" includes: determining a first local reference image and a second local reference image from all local images of the reference image, and determining a first local sample image and a second local sample image from all local images of the sample image, the first local reference image and the second local reference image being located at different positions in the reference image, the first local sample image and the second local sample image being located at different positions in the sample image; extracting, by using the style monitoring network of the SN, a first local reference style feature corresponding to the first local reference image, a second local reference style feature corresponding to the second local reference image, a first local sample style feature corresponding to the first local sample image, and a second local sample style feature corresponding to the second local sample image; comparing the first local reference style feature with the second local reference style feature, to obtain a local style loss between the first local reference image and the second local reference image; comparing the first local sample style feature with the second local sample style feature, to obtain a local style loss between the first local sample image and the second local sample image; and calculating the local style loss of the reference image according to the local style loss between the first local reference image and the second local reference image, and calculating the local style loss of the sample image according to the local style loss between the first local sample image and the second local sample image.

In some embodiments, the style monitoring network may alternatively include a first encoder and a second encoder, the first encoder and the second encoder share weight parameters with each other, and the step of "separately extracting, by using a style monitoring network of a to-be-trained model, style features of the first local reference image, the second local reference image, the first local sample image, and the second local sample image, that is, a first local reference style feature, a second local reference style feature, a first local sample style feature, and a second local sample style feature" may include the following steps: performing style feature extraction on the first local reference image and the first local sample image by using the first encoder, to obtain the first local reference style feature corresponding to the first local reference image, and the first local sample style feature corresponding to the first local sample image; and performing style feature extraction on the second local reference image and the second local sample image by using the second encoder, to obtain the second local reference style feature corresponding to the second local reference image, and the second local sample style feature corresponding to the second local sample image.

For example, the first encoder of the style monitoring network may perform style feature extraction on the local reference image A, to obtain a style type content feature of the local reference image A; the second encoder of the style monitoring network may perform style feature extraction on the local reference image B, to obtain a style type content feature of the local reference image B; and a local style loss of the reference image is finally predicted based on the style type content feature of the local reference image A and the style type content feature of the local reference image B.

In step 106, the generation network is trained based on the global style loss, the content loss, the local style loss of the reference image, and the local style loss of the sample image, to obtain a trained generation network.

In some embodiments, an image style type of the first reference image may be discriminated in step 102. Therefore, step 106 may specifically include: adjusting parameters of the network model based on the quality loss and the image style type until convergence, to obtain a trained model, the trained model including a trained GAN.

In some embodiments, a conversion loss between the first reference image and the training image may be determined in step 102. Therefore, step 106 may specifically include: adjusting parameters of the network model based on the quality loss and the conversion loss between the first reference image and the training image until convergence, to obtain a trained model, the trained model including a trained GAN.

In some embodiments, in step 102, an image style type of the first reference image may be discriminated, and a conversion loss between the first reference image and the training image is determined. Therefore, step 106 may specifically include: adjusting parameters of the network model based on the quality loss, the image style type, and the conversion loss between the first reference image and the training image until convergence, to obtain a trained model, the trained model including a trained GAN.

In some embodiments, the parameters may be adjusted by using a plurality of algorithms. For example, weight parameters of the network model may be adjusted by using a gradient descent method. The weight parameters of the network model may be adjusted by using an algorithm such as a batch gradient descent (BGD) algorithm, a stochastic gradient descent (SGD) algorithm, a Nesterov accelerated gradient (NAG) algorithm, or an adaptive moment estimation (Adam) algorithm.

In step 107, style conversion is performed on a to-be-processed image by using the trained generation network, to obtain a style converted image.

The model training has been completed in the foregoing step 101 to step 106. In step 107, style conversion may be performed on the to-be-processed image by using the trained GAN, to obtain a style converted image.

Specifically, to reduce the calculation amount and optimize the efficiency of image processing, the trained GAN includes a trained forward generation network and a trained reverse network. In a case that the to-be-processed image is obtained, the following steps may be specifically performed: obtaining a style type conversion instruction; in response to a determination that the style type conversion instruction is a forward conversion instruction, performing forward conversion on the to-be-processed image by using the trained forward generation network, to obtain the image after the style conversion; and in response to a determination that the style type conversion instruction is a reserve conversion instruction, performing reserve conversion on the to-be-processed image by using the trained reverse generation network, to obtain the image after the style conversion.

The style type conversion instruction may include style type information. The style type information may indicate that the to-be-processed image is converted into a specific style type.

For example, referring to Table 1, if the style type information is "A sunshine style type is converted into a rainy style type", the style type conversion instruction may be determined as a forward conversion instruction; and if the style type information is "A rainy style type is converted into a sunshine style type", the style type conversion instruction may be determined as a reverse conversion instruction.

TABLE 1

| Style type information | Type of style type conversion instruction |
|---|---|
| A sunshine style type is converted into a rainy style type | Forward conversion instruction |
| A rainy style type is converted into a sunshine style type | Reverse conversion instruction |

The image processing solution provided in this embodiment of the application is applicable to various image processing scenarios. For example, migration learning and data enhancement may be performed by using this solution; and in another example, a switching between daytime/night style types on a streetscape picture, and the like may be used in this solution.

For example, for to-be-processed daytime streetscape images, a technician may collect a daytime picture and a night picture that are in the same streetscape, and perform model training based on the pictures. After the training is completed, forward conversion is performed on the to-be-processed daytime streetscape image by using a trained forward generation network of a trained model, to obtain a night streetscape image after conversion.

It can be learned from the above that in this embodiment of this application, a sample image and a GAN may be obtained, the GAN including a generation network and an adversarial network; style conversion is performed on the sample image by using the generation network, to obtain a reference image; global style recognition is performed on the reference image by using the adversarial network, to determine a global style loss between the reference image and the sample image; image content recognition is performed on the reference image and the sample image, to determine a content loss between the reference image and the sample image; local style recognition is performed on the reference image and the sample image, to determine a local style loss of the reference image and a local style loss of the sample image; the generation network is trained based on the global style loss, the content loss, the local style loss of the reference image, and the local style loss of the sample image, to obtain a trained generation network; and style conversion is performed on a to-be-processed image by using the trained generation network, to obtain a style converted image.

In some embodiments, in step 103, a global style type of the sample image may be discriminated, the sample image is annotated with the global style type, and the generation network is then trained by using the annotated sample image, to obtain a trained generation network. Therefore, in this embodiment of this solution, the sample image may be used for training the network model without excessive annotation, thereby reducing time and labor costs required for collecting and organizing the model training samples, and improving the efficiency of the image processing method.

In this embodiment of this application, network parameters of the trained generation network may be optimized according to the content loss between the reference image and the sample image, the local style loss of the reference image, and the local style loss of the sample image, so that an image after the style conversion generated by using the trained generation network locally has the same style, and it is ensured that the image after the style conversion does not have gaps and omissions or damages in content.

Therefore, in this solution, the generation network may be trained, and the network quality of the generation network may be effectively optimized, so that the image quality of the image after the style conversion generated by using the trained GAN is improved, and the quality of the image after the style conversion generated by using the image processing method can be improved in this solution.

In this embodiment, according to the method described in the foregoing embodiments, the following further provides detailed description.

In this embodiment, a scene image in streetscape recognition of autonomous driving may be standardized, where an autonomous vehicle of a user may acquire image data under different time periods and different scenes (such as daytime, dusk, night, and rainy day). In this embodiment, a night scene image may be converted into a daytime scene image, or a daytime scene image may be converted into a night scene image.

Finally, further machine learning task training, for example, recognition and detection of pedestrians and vehicles, may be performed by using standardized data.

The method in the embodiments of this application is described in detail below by using a scene of mutual conversion between streetscape pictures with sunny day and cloudy day style types as an example.

Figure 2A:
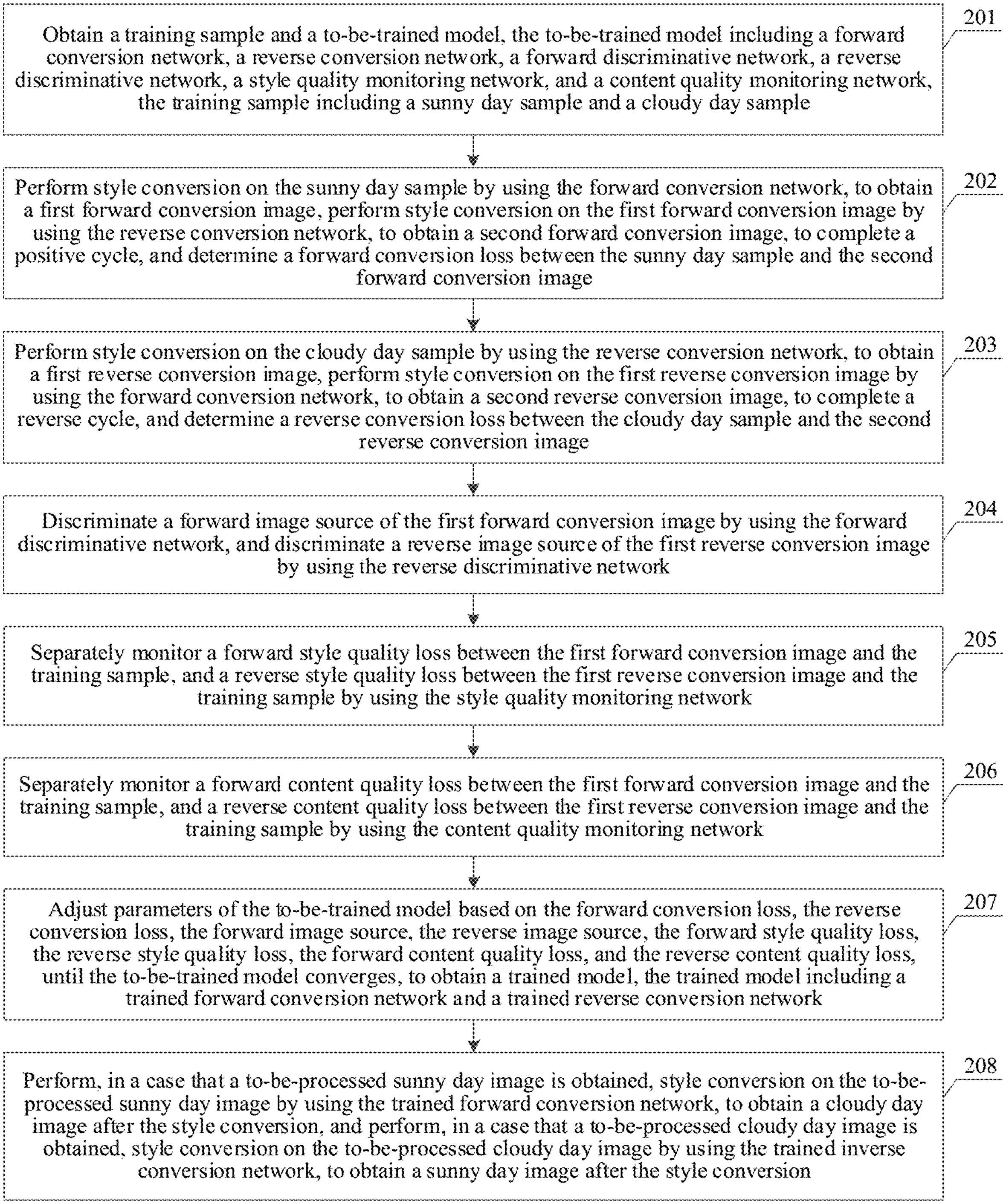
FIG. 2*a* is a second schematic flowchart of an image processing method according to an embodiment of this application.

As shown in FIG. 2*a*, a specific procedure of the image processing method is as follows.

In step 201, a sample image and a GAN are obtained, the GAN including a forward generation network, a reverse generation network, a forward adversarial network, a reverse adversarial network, a style monitoring network, and a content monitoring network, the sample image including a sunny day sample and a cloudy day sample.

Figure 2B:
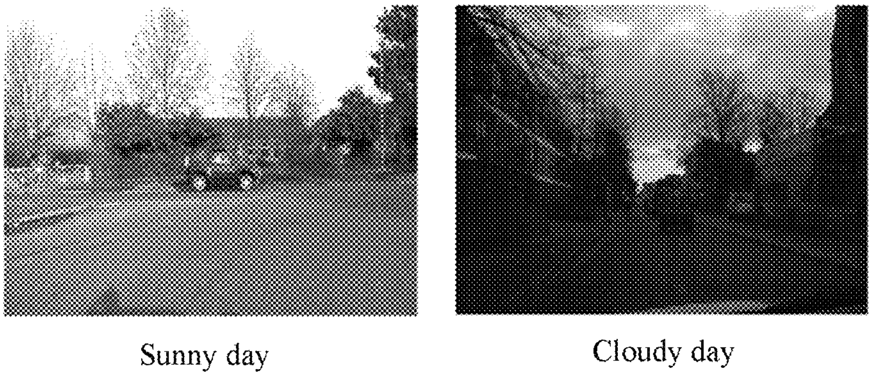
FIG. 2*b* is streetscape pictures of an image processing method according to an embodiment of this application.

Referring to FIG. 2*b*, the sample image is a streetscape picture annotated with a weather style type.

When model training is performed, a pair of streetscape pictures with the same streetscape but different weather style types need to be obtained.

For example, a streetscape picture of a grocery store X on a sunny day annotated with the sunny day and a streetscape picture of the grocery store X on a cloudy day annotated with the cloudy day are a pair of pictures.

In this embodiment, a cycleGAN and an SN are included, where the cycleGAN includes a forward generation network, a reverse generation network, a forward adversarial network, and a reverse adversarial network; and the SN includes a style monitoring network and a content monitoring network, the style monitoring network and the content monitoring network sharing a pair of encoders that share weight parameters.

In this embodiment, the sample image may be set by the technician, and the sample image may be obtained by using the server.

In some embodiments, a series of preprocessing, such as data cleaning and data augmentation, may be further performed on the sample image, to further improve the quality of the generated picture.

In step 202, style conversion is performed on the sunny day sample by using the forward generation network, to obtain a first forward reference image, style conversion is performed on the first forward reference image by using the reverse generation network, to obtain a second forward reference image, to complete a positive cycle, and a forward conversion loss is determined between the sunny day sample and the second forward reference image.

Figure 2C:
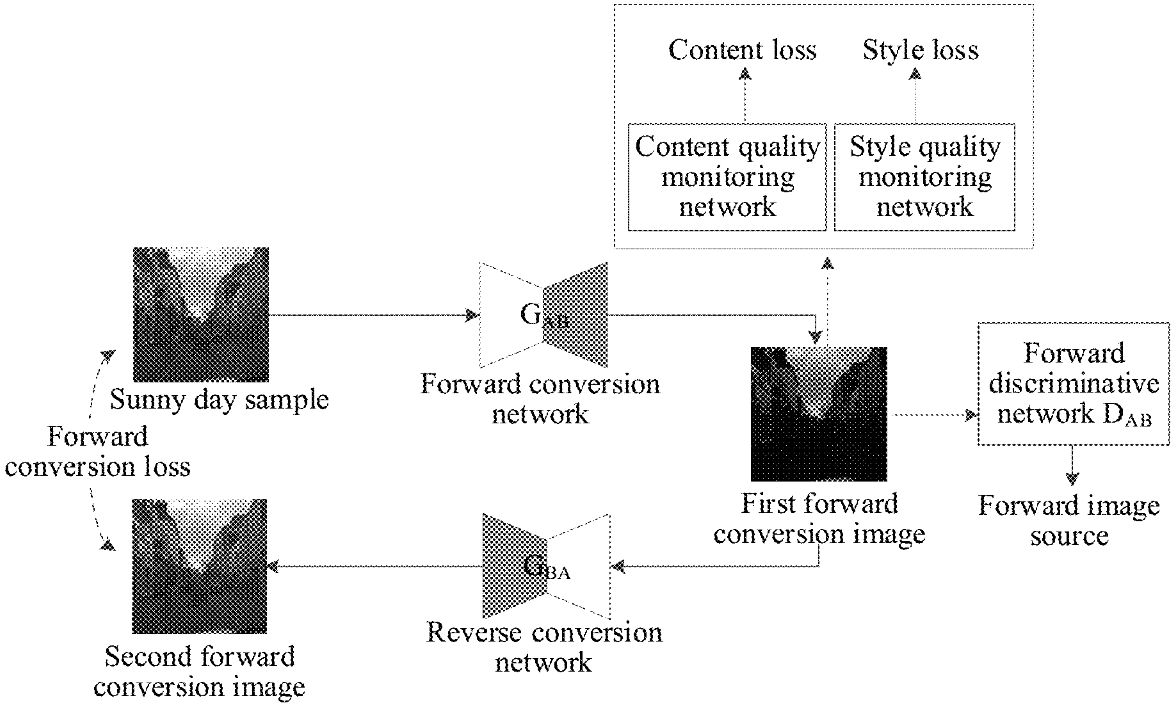
FIG. 2*c* is a schematic diagram of a positive cycle of an image processing method according to an embodiment of this application.

FIG. 2*c* shows one positive cycle, where a forward generation network GAB may perform style conversion on a sunny day sample, to obtain a first forward reference image, may perform style conversion on the first forward reference image by using the reverse generation network, to obtain a second forward reference image, and then, may determine a forward conversion loss between the sunny day sample and the second forward reference image.

The forward conversion loss constrains the sunny day sample to be similar to the second forward reference image reconstructed from the first forward reference image.

In step 203, style conversion is performed on the cloudy day sample by using the reverse generation network, to obtain a first reverse reference image, style conversion is performed on the first reverse reference image by using the forward generation network, to obtain a second reverse reference image, to complete a reverse cycle, and a reverse conversion loss is determined between the cloudy day sample and the second reverse reference image.

Figure 2D:
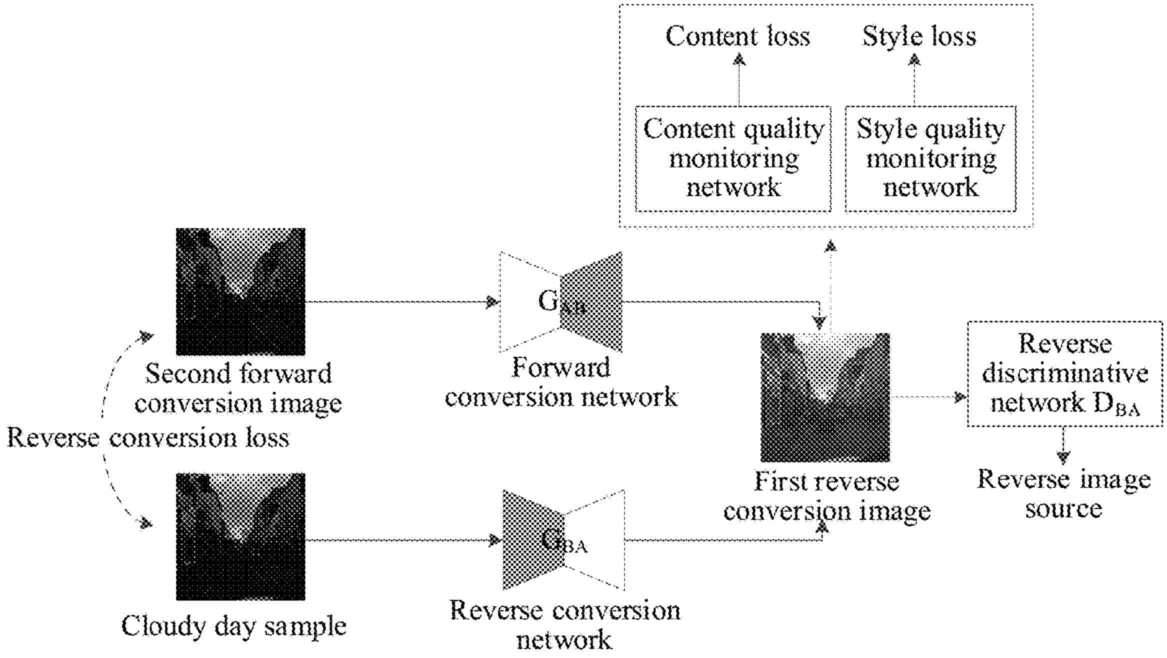
FIG. 2*d* is a schematic diagram of a reserve cycle of an image processing method according to an embodiment of this application.

FIG. 2*d* shows one reverse cycle, where a reverse generation network may perform style conversion on a cloudy day sample, to obtain a first reverse reference image, and perform style conversion on the first reverse reference image by using a forward generation network, to obtain a second reverse reference image.

A reverse conversion loss constrains the cloudy day sample to be similar to the second reverse reference image reconstructed from the first reverse reference image.

In step 204, a forward image style type of the first forward reference image is discriminated by using the forward adversarial network, and a reverse image style type of the first reverse reference image is discriminated by using the reverse adversarial network.

Referring to FIG. 2*c*, in one positive cycle, the forward adversarial network DAB may further discriminate a forward image style type of the first forward reference image.

Referring to FIG. 2*d*, in one reverse cycle, the reverse adversarial network DBA may further discriminate a reverse image style type of the first reverse reference image.

In step 205, a forward local style loss between the first forward reference image and the sample image, and a reverse local style loss between the first reverse reference image and the sample image are separately monitored by using the style monitoring network.

Because the image generated by the GAN may be deformed in style type, the style monitoring network may be used for strictly restricting a whole style type of the image generated by the GAN, so that the global style type of the image is consistent.

Figure 2E:
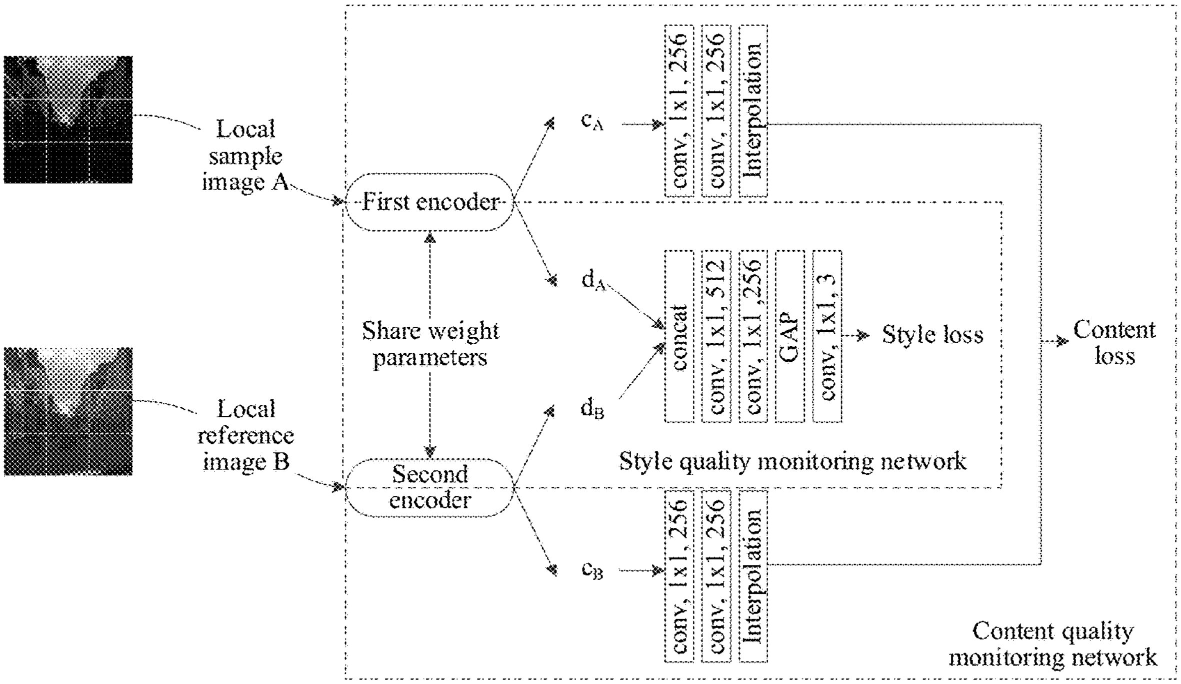
FIG. 2*e* is a schematic diagram of a quality monitoring procedure of an image processing method according to an embodiment of this application.

Referring to a quality monitoring process shown in FIG. 2*e*, a style monitoring network may separately monitor a forward local style loss between a first forward reference image and a sample image, and a reverse local style loss between a first reverse reference image and the sample image.

The style monitoring network includes a concatenation layer (Concat), a convolutional layer (Conv), and a global average pooling layer (GAP).

In step 206, A forward content loss between the first forward reference image and the sample image, and a reverse content loss between the first reverse reference image and the sample image are separately monitored by using the content monitoring network.

Because the image generated by the GAN may be deformed in content, the content monitoring network may be used for strictly restricting whole content of the image generated by the GAN, so that the content of a to-be-converted image is consistent with that of a converted image.

Referring to the quality monitoring process shown in FIG. 2*e*, the content monitoring network may separately monitor a forward content loss between the first forward reference image and the sample image, and a reverse content loss between the first reverse reference image and the sample image.

The content monitoring network includes Conv and an interpolation layer.

cA is a content feature of a local image in a first reference image, dA is a style feature of the local image in the first reference image, cB is a content feature of a local image in the sample image, and dB is a style feature of the local image in the sample image.

When cA and cB pass through a 1×1 Conv, a size of an original input patch may be interpolated back by using a nearest interpolation method, to calculate a content consistency loss.

A style monitoring network and the content monitoring network share two encoders that share weight parameters. The encoder may encode a two-dimensional (2D) image into a feature hidden space, and a structure of the encoder is shown in Table 2:

TABLE 2

| Layers | Encoder | Layer Info | Output size |
|---|---|---|---|
| 1 | Conv, L-ReLU | (63, 3, 1, 2) | 86 × 86 |
| 2 | Conv, L-ReLU | (128, 3, 1, 2) | 43 × 43 |
| 3 | Conv, L-ReLU | (256, 3, 1, 2) | 22 × 22 |
| 4 | Conv, L-ReLU | (512, 3, 1, 2) | 11 × 11 |

The encoder includes 4 Convs and a leaky ReLU (L-ReLU) layer, where parameter information of each Conv is listed in layer info of Table 2, including the number of channels, a size of a convolution kernel, a padding size, and a step size.

In step 207, parameters are adjusted based on the forward conversion loss, the reverse conversion loss, the forward image style type, the reverse image style type, the forward local style loss, the reverse local style loss, the forward content loss, and the reverse content loss until convergence, to obtain a trained model, the trained model including a trained forward generation network and a trained reverse generation network.

For this step, refer to step 104, and details are not described herein again.

In step 208, a to-be-processed sunny day image is obtained, style conversion is performed on the to-be-processed sunny day image by using the trained forward generation network, to obtain a cloudy day image after the style type conversion, and when a to-be-processed cloudy day image is obtained, style conversion is performed on the to-be-processed cloudy day image by using the trained reverse generation network, to obtain a sunny day image after the style type conversion.

Through step 201 to step 207, the trained forward generation network GAB and the trained reverse generation network GBA having good performance may be obtained, and bidirectional image style type conversion can be simultaneously implemented according to the GAB and the GBA.

Figure 2F:
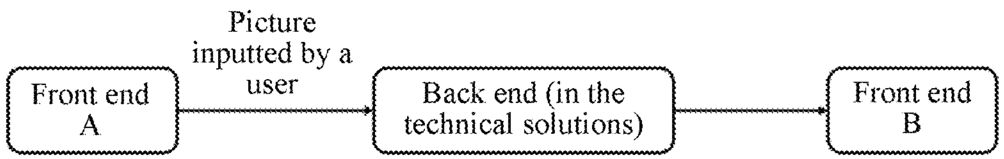
FIG. 2*f* is a schematic diagram of a conversion procedure of an image processing method according to an embodiment of this application.

Referring to FIG. 2*f*, in this solution, the user may transmit a to-be-processed image to a back end through a front end A. In a backend server, by using the image processing method provided in this solution, style type conversion may be performed on the to-be-processed image, and a processed image is finally transmitted to the front end B.

It can be learned from the above that in this embodiment of this application, a sample image and a GAN may be obtained, the GAN including a forward generation network, a reverse generation network, a forward adversarial network, a reverse adversarial network, a style monitoring network, and a content monitoring network, the sample image including a sunny day sample and a cloudy day sample; style conversion is performed on the sunny day sample by using the forward generation network, to obtain a first forward reference image, style conversion is performed on the first forward reference image by using the reverse generation network, to obtain a second forward reference image, to complete a positive cycle, and a forward conversion loss between the sunny day sample and the second forward reference image is determined; style conversion is performed on the cloudy day sample by using the reverse generation network, to obtain a first reverse reference image, style conversion is performed on the first reverse reference image by using the forward generation network, to obtain a second reverse reference image, to complete a reverse cycle, and a reverse conversion loss between the cloudy day sample and the second reverse reference image is determined; a forward image style type of the first forward reference image is discriminated by using the forward adversarial network, and a reverse image style type of the first reverse reference image is discriminated by using the reverse adversarial network; a forward local style loss between the first forward reference image and the sample image, and a reverse local style loss between the first reverse reference image and the sample image are separately monitored by using the style monitoring network; a forward content loss between the first forward reference image and the sample image, and a reverse content loss between the first reverse reference image and the sample image are separately monitored by using the content monitoring network; parameters are adjusted based on the forward conversion loss, the reverse conversion loss, the forward image style type, the reverse image style type, the forward local style loss, the reverse local style loss, the forward content loss, and the reverse content loss until convergence, to obtain a trained model, the trained model including a trained forward generation network and a trained reverse generation network; and when a to-be-processed sunny day image is obtained, style conversion is performed on the to-be-processed sunny day image by using the trained forward generation network, to obtain a cloudy day image after the style type conversion, and when a to-be-processed cloudy day image is obtained, style conversion is performed on the to-be-processed cloudy day image by using the trained reverse generation network, to obtain a sunny day image after the style type conversion.

The image generated in this solution is not deformed in content, content of the images between the two images is the same, and whole style types of the images are also the same. Therefore, the image generated in this solution has high quality, and the training image in this solution may be used for model training without additional annotation, thereby reducing the time required for data preparation, and improving the efficiency of image processing. Therefore, the quality of the image generated by using the image processing method can be improved in this solution.

To implement the foregoing method better, the embodiments of this application further provide an image processing apparatus. The image processing apparatus may be specifically integrated in an electronic device. The electronic device may be a device such as a terminal or a server. The terminal may be a device such as a mobile phone, a tablet computer, a smart Bluetooth device, a notebook computer, or a PC. The server may be a single server, or may be a server cluster including a plurality of servers.

For example, in this embodiment, the method in this embodiment of this application is described in detail by using an example in which the image processing apparatus is integrated in the server.

Figure 3:
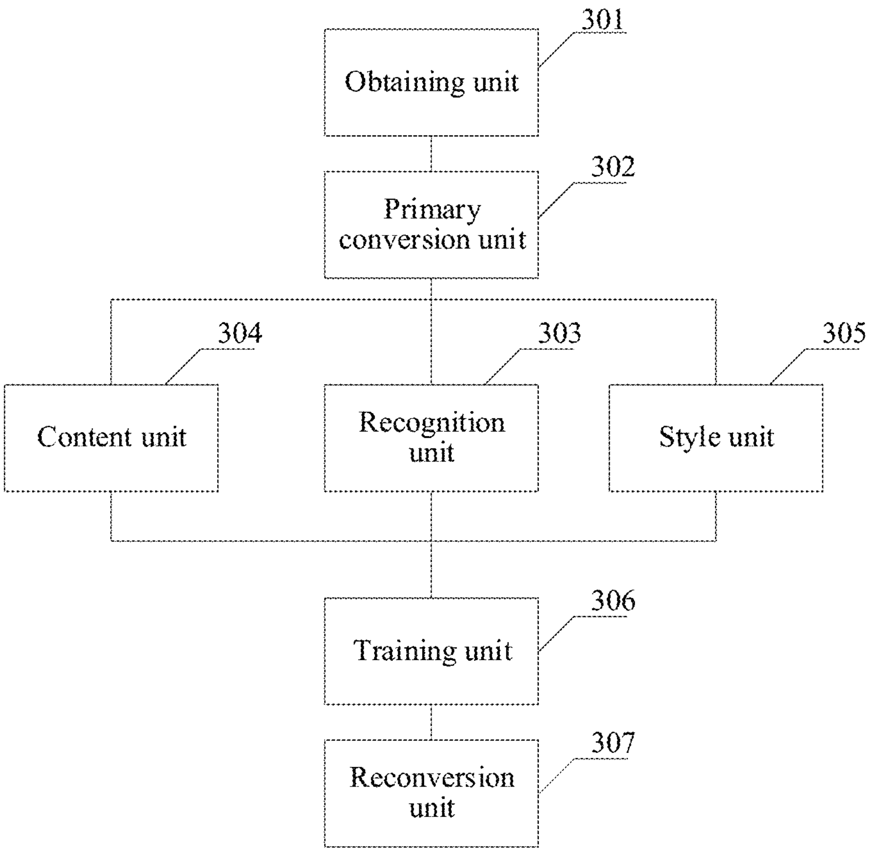
FIG. 3 is a first schematic structural diagram of an image processing apparatus according to an embodiment of this application.

For example, as shown in FIG. 3, the image processing apparatus may include an obtaining unit 301, a primary conversion unit 302, a recognition unit 303, a content unit 304, a style unit 305, a training unit 306, and a reconversion unit 307 as follows.

The obtaining unit 301 may be configured to obtain a sample image and a GAN, the GAN including a generation network and an adversarial network.

The primary conversion unit 302 may be configured to perform style conversion on the sample image by using the generation network, to obtain a reference image.

In some embodiments, the reference image may include a first reference image and a second reference image, and the primary conversion unit 302 may be configured to: perform, by using the generation network, style conversion on the sample image to obtain the first reference image, and perform style conversion on the first reference image to obtain the second reference image.

In some embodiments, the generation network may include a forward generation network and a reverse generation network, the sample image may include a forward sample image, the first reference image may include a first forward reference image, and the second reference image may include a second forward reference image; and the primary conversion unit 302 may specifically include a first forward subunit and a second forward subunit as follows.

The first forward subunit is configured to perform style conversion on the forward sample image by using the forward generation network, to obtain the first forward reference image.

The second forward subunit is configured to perform style conversion on the first forward reference image by using the reverse generation network, to obtain the second forward reference image.

In some embodiments, the generation network may include a forward generation network and a reverse generation network, the sample image may include a reverse sample image, the first reference image may include a first reverse reference image, and the second reference image may include a second reverse reference image; and the primary conversion unit 302 may specifically include a first reverse subunit and a second reverse subunit as follows.

The first reverse subunit is configured to perform style conversion on the reverse sample image by using the reverse generation network, to obtain the first reverse reference image.

The second reverse subunit is configured to perform style conversion on the first reverse reference image by using the forward generation network, to obtain the second reverse reference image.

In some embodiments, after performing, by using the generation network, style conversion on the sample image to obtain the first reference image, and performing style conversion on the first reference image to obtain the second reference image, the primary conversion unit 302 may be specifically configured to: calculate a conversion loss between the sample image and the second reference image.

The recognition unit 303 may be configured to: predict a similarity between the first reference image and the sample image by using the adversarial network; and calculate the global style loss between the reference image and the sample image according to the similarity between the first reference image and the sample image.

Specifically, in some embodiments, the recognition unit 303 may be configured to: in response to a determination that the similarity between the first reference image and the sample image falls within a preset forward range, determine an image style type of the first reference image as the image style type of the first reference image; and in response to a determination that the similarity between the first reference image and the sample image falls within a preset reserve range, determine the image style type of the first reference image as an image style type of the second reference image; collect statistics on the image style types of the first reference image, to obtain a statistical result; and calculate the global style loss between the reference image and the sample image according to the statistical result.

The content unit 304 may perform image content recognition on the reference image and the sample image, to determine a content loss between the reference image and the sample image.

In some embodiments, the content unit 304 may perform image content recognition on the reference image and the sample image by using a content monitoring network of an SN, to determine the content loss between the reference image and the sample image.

Specifically, in some embodiments, the content unit 304 may specifically include a content local subunit, a content feature subunit, a local content loss subunit, and a content loss subunit as follows.

The content local subunit is configured to determine a local reference image from all local images of the reference image, and determine a local sample image from all local images of the sample image, a position of the local reference image in the reference image being the same as a position of the local sample image in the sample image.

The content feature subunit is configured to extract, by using the content monitoring network of the SN, a local reference content feature corresponding to the local reference image, and a local sample content feature corresponding to the local sample image.

The local content loss subunit is configured to compare the local reference content feature with the local sample content feature, to obtain a local content loss between the local reference image and the local sample image.

The content loss subunit is configured to determine the content loss between the reference image and the sample image according to the local content loss.

In some embodiments, the content monitoring network may include a first encoder and a second encoder, the first encoder and the second encoder share weight parameters with each other, and the content feature subunit may be specifically configured to: perform content feature extraction on the local reference image by using the second encoder, to obtain the local reference content feature of the local reference image; and perform content feature extraction on the local sample image by using the first encoder, to obtain the local sample content feature of the local sample image.

The style unit 305 may be configured to perform local style recognition on the reference image and the sample image, to determine a local style loss of the reference image and a local style loss of the sample image.

In some embodiments, the style unit 305 may be specifically configured to perform local style recognition on the reference image and the sample image by using a style monitoring network of the SN, to determine the local style loss of the reference image and the local style loss of the sample image.

In this case, in some embodiments, the style unit 305 may specifically include a style local subunit, a style feature subunit, a local reference style loss subunit, a local sample style loss subunit, and a style loss subunit as follows:

The style local subunit is configured to determine a first local reference image and a second local reference image from all local images of the reference image, and determine a first local sample image and a second local sample image from all local images of the sample image, the first local reference image and the second local reference image being located at different positions in the reference image, the first local sample image and the second local sample image being located at different positions in the sample image.

The style feature subunit is configured to extract, by using the style monitoring network of the SN, a first local reference style feature corresponding to the first local reference image, a second local reference style feature corresponding to the second local reference image, a first local sample style feature corresponding to the first local sample image, and a second local sample style feature corresponding to the second local sample image.

The local reference style loss subunit is configured to compare the first local reference style feature with the second local reference style feature, to obtain a local style loss between the first local reference image and the second local reference image.

The local sample style loss subunit is configured to compare the first local sample style feature with the second local sample style feature, to obtain a local style loss between the first local sample image and the second local sample image.

The style loss subunit is configured to calculate the local style loss of the reference image according to the local style loss between the first local reference image and the second local reference image, and calculate the local style loss of the sample image according to the local style loss between the first local sample image and the second local sample image.

In this case, in some embodiments, the style monitoring network may include a first encoder and a second encoder, the first encoder and the second encoder may share weight parameters with each other, and the style feature subunit may be specifically configured to: perform style feature extraction on the first local reference image and the first local sample image by using the first encoder, to obtain the first local reference style feature corresponding to the first local reference image, and the first local sample style feature corresponding to the first local sample image; and perform style feature extraction on the second local reference image and the second local sample image by using the second encoder, to obtain the second local reference style feature corresponding to the second local reference image, and the second local sample style feature corresponding to the second local sample image.

The training unit 306 may be configured to train the generation network based on the global style loss, the content loss, the local style loss of the reference image, and the local style loss of the sample image, to obtain a trained generation network.

In some embodiments, the primary conversion unit 302 may be configured to calculate a conversion loss between the sample image and the second reference image, and in this case, the training unit 306 may be specifically configured to: train the generation network based on the conversion loss, the global style loss, the content loss, the local style loss of the reference image, and the local style loss of the sample image, to obtain the trained generation network.

The reconversion unit 307 may be configured to perform style conversion on the to-be-processed image by using the trained generation network, to obtain an image after the style conversion.

In some embodiments, the trained generation network may include a trained forward generation network and a trained reverse generation network, and the reconversion unit 307 may be specifically configured to: obtain a style type conversion instruction; in response to a determination that the style type conversion instruction is a forward conversion instruction, perform forward conversion on the to-be-processed image by using the trained forward generation network, to obtain the image after the style conversion; and in response to a determination that the style type conversion instruction is a reserve conversion instruction, perform reserve conversion on the to-be-processed image by using the trained reverse generation network, to obtain the image after the style conversion.

During specific implementation, the foregoing units may be implemented as independent entities, or may be combined, or may be implemented as a same entity or several entities. For specific implementation of the foregoing units, refer to the foregoing method embodiments. Details are not described herein again.

It can be learned from the above that in the image processing apparatus in this embodiment, an obtaining unit may obtain a sample image and a GAN, the GAN including a generation network and an adversarial network; a primary conversion unit performs style conversion on the sample image by using the generation network, to obtain a reference image; a recognition unit performs global style recognition on the reference image by using the adversarial network, to determine a global style loss between the reference image and the sample image; a content unit performs image content recognition on the reference image and the sample image, to determine a content loss between the reference image and the sample image; a style unit performs local style recognition on the reference image and the sample image, to determine a local style loss of the reference image and a local style loss of the sample image; a training unit trains the generation network based on the global style loss, the content loss, the local style loss of the reference image, and the local style loss of the sample image, to obtain a trained generation network; and a reconversion unit performs style conversion on the to-be-processed image by using the trained generation network, to obtain an image after the style conversion. Therefore, the quality of the image after the style conversion generated in the image processing method can be improved in this solution.

The embodiments of this application further provide an electronic device, and the electronic device may be a device such as a terminal or a server. The terminal may be a mobile phone, a tablet computer, a smart Bluetooth device, a notebook computer, a PC, or the like. The server may be a single server, or may be a server cluster including a plurality of servers.

In some embodiments, the image processing apparatus may alternatively be integrated in a plurality of electronic devices. For example, the image processing apparatus may be integrated in a plurality of servers, and the plurality of servers implement the image processing method in this application. In some embodiments, the image processing apparatus may alternatively be implemented by one server.

Figure 4:
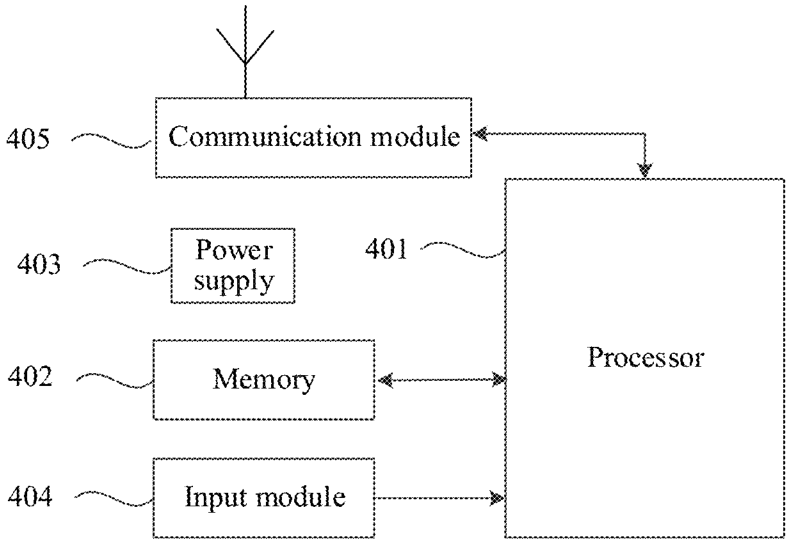
FIG. 4 is a schematic structural diagram of a server according to an embodiment of this application.

In this embodiment, detailed description is made by using an example in which the electronic device in this embodiment is a server. For example, FIG. 4 is a schematic structural diagram of a server according to an embodiment of this application. Details are as follows.

The server may include components such as a processor 401 (processing circuitry) including one or more processing cores, a memory 402 including one or more computer-readable storage media (non-transitory computer-readable storage medium), a power supply 403, an input module 404, and a communication module 405. A person skilled in the art may understand that the structure of the server shown in FIG. 4 does not constitute a limitation to the server. The server may include more or fewer components than those shown in the figure, or some components may be combined, or a different component deployment may be used.

The processor 401 is a control center of the server, and is connected to various parts of the entire server by using various interfaces and lines. By running or executing a software program and/or module stored in the memory 402, and invoking data stored in the memory 402, the processor executes various functions of the server and performs data processing, thereby monitoring the entire server. In some embodiments, the processor 401 may include one or more processing cores. In some embodiments, the processor 401 may integrate an application processor and a modem. The application processor mainly processes an operating system, a user interface, an application program, and the like. The modem mainly processes wireless communication. It may be understood that the modem may either not be integrated into the processor 401.

The memory 402 may be configured to store a software program and a module. The processor 401 runs the software program and the module stored in the memory 402, to implement various functional applications and data processing. The memory 402 may mainly include a program storage area and a data storage area. The program storage area may store an operating system, an application program required by at least one function (for example, a sound playback function and an image playback function), or the like. The data storage area may store data created according to use of the server. In addition, the memory 402 may include a high-speed random access memory, and may also include a non-volatile memory, such as at least one magnetic disk storage device, a flash memory, or another volatile solid-state storage device. Correspondingly, the memory 402 may further include a memory controller, to allow the processor 401 to access the memory 402.

The server further includes the power supply 403 for supplying power to the components. In some embodiments, the power supply 403 may be logically connected to the processor 401 by using a power management system, thereby implementing functions such as charging, discharging, and power consumption management by using the power management system. The power supply 403 may further include one or more of a direct current or alternating current power supply, a re-charging system, a power failure detection circuit, a power supply converter or inverter, a power supply state indicator, and any other components.

The server may further include the input module 404. The input module 404 may be configured to receive input digit or character information, and generate a keyboard, mouse, joystick, optical, or track ball signal input related to user settings and function control.

The server may further include the communication module 405. In some embodiments, the communication module 405 may include a wireless module, and the server may perform short distance wireless transmission by using the wireless module of the communication module 405, to provide wireless broadband Internet access for the user. For example, the communication module 405 may be configured to help the user send and receive an email, browse a webpage, access stream media, and so on.

Although not shown in the figure, the server may further include a display unit. Details are not described herein. Specifically, in this embodiment, the processor 401 in the server may load executable files corresponding to processes of one or more application programs into the memory 402 according to the following computer-readable instructions, and the processor 401 runs the application programs stored in the memory 402, to implement various functions as follows: obtaining a sample image and a GAN, the GAN including a generation network and an adversarial network; performing style conversion on the sample image by using the generation network, to obtain a reference image; performing global style recognition on the reference image by using the adversarial network, to determine a global style loss between the reference image and the sample image; performing image content recognition on the reference image and the sample image, to determine a content loss between the reference image and the sample image; performing local style recognition on the reference image and the sample image, to determine a local style loss of the reference image and a local style loss of the sample image; training the generation network based on the global style loss, the content loss, the local style loss of the reference image, and the local style loss of the sample image, to obtain a trained generation network; and performing style conversion on the to-be-processed image by using the trained generation network, to obtain an image after the style conversion.

For specific implementations of the foregoing operations, refer to the foregoing embodiments. Details are not described herein again.

It can be learned from the above that the quality of the image after the style conversion generated by using the image processing method can be improved in this solution.

A person of ordinary skill in the art may understand that, all or some steps of the methods in the foregoing embodiments may be implemented by using computer-readable instructions, or implemented through computer-readable instructions controlling relevant hardware, and the computer-readable instructions may be stored in one or more computer-readable storage media and loaded and executed by one or more processors.

Therefore, the embodiments of this application provide one or more non-volatile storage media storing computer-readable instructions, the computer-readable instructions, when executed by one or more processors, causing the one or more processors to perform the operations in any image processing method provided in the embodiments of this application. For example, the computer-readable instructions may perform the following steps: obtaining a sample image and a GAN, the GAN including a generation network and an adversarial network; performing style conversion on the sample image by using the generation network, to obtain a reference image; performing global style recognition on the reference image by using the adversarial network, to determine a global style loss between the reference image and the sample image; performing image content recognition on the reference image and the sample image, to determine a content loss between the reference image and the sample image; performing local style recognition on the reference image and the sample image, to determine a local style loss of the reference image and a local style loss of the sample image; training the generation network based on the global style loss, the content loss, the local style loss of the reference image, and the local style loss of the sample image, to obtain a trained generation network; and performing style conversion on the to-be-processed image by using the trained generation network, to obtain an image after the style conversion.

The storage medium may include a read-only memory (ROM), a random access memory (RAM), a magnetic disk, an optical disc, or the like.

Because the computer-readable instructions stored in the storage medium may perform the operations of any image processing method provided in the embodiments of this application, the instructions can implement beneficial effects that can be implemented by any image processing method provided in the embodiments of this application. For details, refer to the foregoing embodiments. Details are not described herein again.

Optionally, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the operations in the foregoing method embodiments.

The steps in the embodiments of this application are not necessarily performed according to a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the other step.

The image processing method and apparatus, the server, and the computer-readable storage medium provided in the embodiments of this application are described in detail above. Although the principles and implementations of this application are described by using specific examples in this specification, the descriptions of the foregoing embodiments are merely intended to help understand the method and the core idea of the method in this application. Meanwhile, a person skilled in the art may make variations to the specific implementations and application scopes according to the idea of this application. In conclusion, the content of the specification is not construed as a limitation to this application.

What is claimed is:

1. An image processing method comprising:
- performing style conversion on a sample image by using a generation network, to obtain a reference image;
- performing style recognition on the reference image by using an adversarial network, to determine a style loss between the reference image and the sample image;
- performing local style recognition on the reference image and the sample image by a style monitoring network of a siamese network (SN), to determine a local style loss of the reference image and a local style loss of the sample image;
- performing image content recognition on the reference image and the sample image by using a content monitoring network of the SN, to determine a content loss between the reference image and the sample image; and
- training the generation network based on the style loss, the content loss, the local style loss of the reference image, and the local style loss of the sample image, to obtain a trained generation network.

2. The image processing method according to claim 1, further comprising:
- performing, by a server, style conversion on a to-be-processed image by using the trained generation network, to obtain a style converted image.

3. The image processing method according to claim 2, wherein the trained generation network includes a trained forward generation network and a trained reverse generation network, and the performing the style conversion on the to-be-processed image comprises:
- obtaining a style type conversion instruction;
- when the style type conversion instruction is a forward conversion instruction, performing forward conversion on the to-be-processed image by using the trained forward generation network, to obtain the style converted image; and
- when the style type conversion instruction is a reverse conversion instruction, performing reverse conversion on the to-be-processed image by using the trained reverse generation network, to obtain the style converted image.

4. The image processing method according to claim 1, wherein
- the style recognition is a global style recognition; and
- the style loss includes a global style loss between the reference image and the sample image.

5. The image processing method according to claim 4, wherein
- the reference image includes a first reference image and a second reference image;
- the performing the style conversion on the sample image includes performing, by using the generation network, style conversion on the sample image to obtain the first reference image, and performing style conversion on the first reference image to obtain the second reference image; and
- the performing the global style recognition on the reference image comprises:
  - predicting a similarity between the first reference image and the sample image by using the adversarial network, and
  - calculating the global style loss between the reference image and the sample image according to the similarity between the first reference image and the sample image.

6. The image processing method according to claim 5, wherein the generation network includes a forward generation network and a reverse generation network, the sample image includes a forward sample image, the first reference image includes a first forward reference image, and the second reference image includes a second forward reference image;

the performing the style conversion on the sample image includes performing style conversion on the forward sample image by using the forward generation network, to obtain the first forward reference image; and the performing the style conversion on the first reference image includes performing style conversion on the first forward reference image by using the reverse generation network, to obtain the second forward reference image.

7. The image processing method according to claim 5, wherein the generation network includes a forward generation network and a reverse generation network, the sample image includes a reverse sample image, the first reference image includes a first reverse reference image, and the second reference image includes a second reverse reference image;

the performing the style conversion on the sample image includes performing style conversion on the reverse sample image by using the reverse generation network, to obtain the first reverse reference image; and the performing the style conversion on the first reference image includes performing style conversion on the first reverse reference image by using the forward generation network, to obtain the second reverse reference image.

8. The image processing method according to claim 5, further comprising:

calculating a conversion loss between the sample image and the second reference image, wherein the training the generation network includes training the generation network based on the conversion loss, the global style loss, the content loss, the local style loss of the reference image, and the local style loss of the sample image, to obtain the trained generation network.

9. The image processing method according to claim 5, wherein the calculating comprises:

when the similarity between the first reference image and the sample image falls within a preset forward range, determining an image style type of the first reference image as the image style type of the first reference image;

when the similarity between the first reference image and the sample image falls within a preset reverse range, determining the image style type of the first reference image as an image style type of the second reference image;

collecting statistics on the image style types of the first reference image, to obtain a statistical result; and calculating the global style loss between the reference image and the sample image according to the statistical result.

10. The image processing method according to claim 1, wherein the performing the image content recognition on the reference image and the sample image by using the content monitoring network of the SN comprises:

determining a local reference image from all local images of the reference image, and determining a local sample image from all local images of the sample image, a position of the local reference image in the reference image being the same as a position of the local sample image in the sample image;

extracting, by using the content monitoring network of the SN, a local reference content feature corresponding to the local reference image, and a local sample content feature corresponding to the local sample image;

comparing the local reference content feature with the local sample content feature, to obtain a local content loss between the local reference image and the local sample image; and determining the content loss between the reference image and the sample image according to the local content loss.

11. The image processing method according to claim 10, wherein the content monitoring network of the SN includes a first encoder and a second encoder, the first encoder and the second encoder share weight parameters with each other, and the extracting, by using the content monitoring network of the SN, the local reference content feature corresponding to the local reference image, and the local sample content feature corresponding to the local sample image comprises:

performing content feature extraction on the local sample image by using the first encoder, to obtain the local sample content feature of the local sample image; and performing content feature extraction on the local reference image by using the second encoder, to obtain the local reference content feature of the local reference image.

12. The image processing method according to claim 1, wherein the performing the local style recognition on the reference image and the sample image comprises:

determining a first local reference image and a second local reference image from a plurality of local images of the reference image, and determining a first local sample image and a second local sample image from a plurality of local images of the sample image, the first local reference image and the second local reference image being located at different positions in the reference image, the first local sample image and the second local sample image being located at different positions in the sample image;

extracting, by using the style monitoring network of the SN, a first local reference style feature corresponding to the first local reference image, a second local reference style feature corresponding to the second local reference image, a first local sample style feature corresponding to the first local sample image, and a second local sample style feature corresponding to the second local sample image;

comparing the first local reference style feature with the second local reference style feature, to obtain a local style loss between the first local reference image and the second local reference image;

comparing the first local sample style feature with the second local sample style feature, to obtain a local style loss between the first local sample image and the second local sample image; and calculating the local style loss of the reference image according to the local style loss between the first local reference image and the second local reference image, and calculating the local style loss of the sample image according to the local style loss between the first local sample image and the second local sample image.

13. The image processing method according to claim 12, wherein the style monitoring network of the SN includes a first encoder and a second encoder, the first encoder and the second encoder share weight parameters with each other, and the extracting, by using the style monitoring network of the SN, a first local reference style feature corresponding to the first local reference image, a second local reference style feature corresponding to the second local reference image, a first local sample style feature corresponding to the first local sample image, and a second local sample style feature corresponding to the second local sample image comprises:

performing style feature extraction on the first local reference image and the first local sample image by using the first encoder, to obtain the first local reference style feature corresponding to the first local reference image, and the first local sample style feature corresponding to the first local sample image; and performing style feature extraction on the second local reference image and the second local sample image by using the second encoder, to obtain the second local reference style feature corresponding to the second local reference image, and the second local sample style feature corresponding to the second local sample image.

14. An image processing apparatus, comprising:

processing circuitry configured to perform style conversion on a sample image by using a generation network, to obtain a reference image;

perform style recognition on the reference image by using an adversarial network, to determine a style loss between the reference image and the sample image;

perform local style recognition on the reference image and the sample image by a style monitoring network of a siamese network (SN), to determine a local style loss of the reference image and a local style loss of the sample image:

perform image content recognition on the reference image and the sample image by using a content monitoring network of the SN, to determine a content loss between the reference image and the sample image; and train the generation network based on the style loss, the content loss, the local style loss of the reference image, and the local style loss of the sample image, to obtain a trained generation network.

15. The image processing apparatus according to claim 14, wherein the processing circuitry is configured to:

perform style conversion on a to-be-processed image by using the trained generation network, to obtain a style converted image.

16. The image processing apparatus according to claim 14, wherein the style recognition is a global style recognition; and the style loss includes a global style loss between the reference image and the sample image.

17. The image processing apparatus according to claim 16, wherein the reference image includes a first reference image and a second reference image; and the processing circuitry is configured to:

perform the style conversion on the sample image by performing, by using the generation network, style conversion on the sample image to obtain the first reference image, and performing style conversion on the first reference image to obtain the second reference image; and perform the global style recognition on the reference image by predicting a similarity between the first reference image and the sample image by using the adversarial network; and calculating the global style loss between the reference image and the sample image according to the similarity between the first reference image and the sample image.

18. The image processing apparatus according to claim 17, wherein the generation network includes a forward generation network and a reverse generation network, the sample image includes a forward sample image, the first reference image includes a first forward reference image, and the second reference image includes a second forward reference image; and the processing circuitry is configured to:

perform the style conversion on the sample image to obtain the first reference image, by performing style conversion on the forward sample image by using the forward generation network, to obtain the first forward reference image; and perform the style conversion on the first reference image to obtain the second reference image by performing style conversion on the first forward reference image by using the reverse generation network, to obtain the second forward reference image.

19. A non-transitory computer-readable storage medium storing computer-readable instructions thereon, which, when executed by a processor, cause the processor to perform an image processing method comprising:

performing style conversion on a sample image by using a generation network, to obtain a reference image;

performing style recognition on the reference image by using an adversarial network, to determine a style loss between the reference image and the sample image;

performing local style recognition on the reference image and the sample image by a style monitoring network of a siamese network (SN), to determine a local style loss of the reference image and a local style loss of the sample image:

performing image content recognition on the reference image and the sample image by using a content monitoring network of the SN, to determine a content loss between the reference image and the sample image; and training the generation network based on the style loss, the content loss, the local style loss of the reference image, and the local style loss of the sample image, to obtain a trained generation network.

* * * * *